US011778275B2

(12) United States Patent
Yamada

(10) Patent No.: US 11,778,275 B2
(45) Date of Patent: Oct. 3, 2023

(54) INFORMATION PROCESSING TERMINAL, INFORMATION PROCESSING METHOD, AND PROGRAM

(71) Applicant: Saturn Licensing LLC, New York, NY (US)

(72) Inventor: Sohei Yamada, Kanagawa (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 17/440,457

(22) PCT Filed: Mar. 12, 2020

(86) PCT No.: PCT/JP2020/010744
§ 371 (c)(1),
(2) Date: Sep. 17, 2021

(87) PCT Pub. No.: WO2020/195879
PCT Pub. Date: Oct. 1, 2020

(65) Prior Publication Data
US 2022/0167056 A1 May 26, 2022

(30) Foreign Application Priority Data
Mar. 26, 2019 (JP) ................. 2019-059130

(51) Int. Cl.
H04N 21/472 (2011.01)
H04N 21/432 (2011.01)
(Continued)

(52) U.S. Cl.
CPC ..... H04N 21/47217 (2013.01); H04N 21/439 (2013.01); H04N 21/4325 (2013.01); H04N 21/44 (2013.01)

(58) Field of Classification Search
CPC ......... H04N 21/47217; H04N 21/4325; H04N 21/439; H04N 21/44
See application file for complete search history.

(56) References Cited

U.S. PATENT DOCUMENTS 10,339,974 B1* 7/2019 Luo ................. G11B 27/28
2004/0267952 A1* 12/2004 He .................. H04L 65/80
709/231
(Continued)

FOREIGN PATENT DOCUMENTS

JP H07287893 A 10/1995
JP 2001067100 A 3/2001
(Continued)

OTHER PUBLICATIONS

International Search Report for Application No. PCT/JP2020/010744 dated May 26, 2020, pp. 1-3.

Primary Examiner — Mulugeta Mengesha
(74) Attorney, Agent, or Firm — Jeffery J Brosemer

(57) ABSTRACT

The present technology relates to an information processing terminal, an information processing method, and a program, each of which makes it possible to easily switch a setting regarding playback of content.
An information processing terminal according to an aspect of the present technology starts playback of content by using a default value as a setting value of a predetermined setting regarding playback, and controls the playback of the content so that, in a case where a switching operation for switching the predetermined setting is performed, the content is played back by using a setting value selected during previous playback. The present technology is applicable to a smartphone in which various applications can be installed to extend a function thereof.

8 Claims, 12 Drawing Sheets

(51) Int. Cl.
*H04N 21/439* (2011.01)
*H04N 21/44* (2011.01)

(56) References Cited

U.S. PATENT DOCUMENTS

| | | | | |
|---|---|---|---|---|
| 2008/0107402 | A1* | 5/2008 | Angiolillo | H04N 21/47217 386/234 |
| 2008/0152301 | A1* | 6/2008 | Cho | H04N 5/783 386/E5.052 |
| 2009/0141035 | A1* | 6/2009 | Kodama | G11B 27/034 345/530 |
| 2010/0034510 | A1* | 2/2010 | Oda | G06Q 30/06 386/350 |
| 2011/0097059 | A1* | 4/2011 | Sekiguchi | H04N 5/783 386/343 |
| 2013/0031266 | A1* | 1/2013 | Gilson | H04N 21/2387 709/232 |
| 2015/0264411 | A1* | 9/2015 | Rosengren | H04N 21/2387 725/88 |
| 2016/0142773 | A1* | 5/2016 | Terui | G06F 16/40 725/14 |

FOREIGN PATENT DOCUMENTS

| | | |
|---|---|---|
| JP | 2005242667 A | 9/2005 |
| JP | 2006228341 A | 8/2006 |
| JP | 2009303180 A | 12/2009 |
| JP | 20180117311 A | 7/2018 |

* cited by examiner

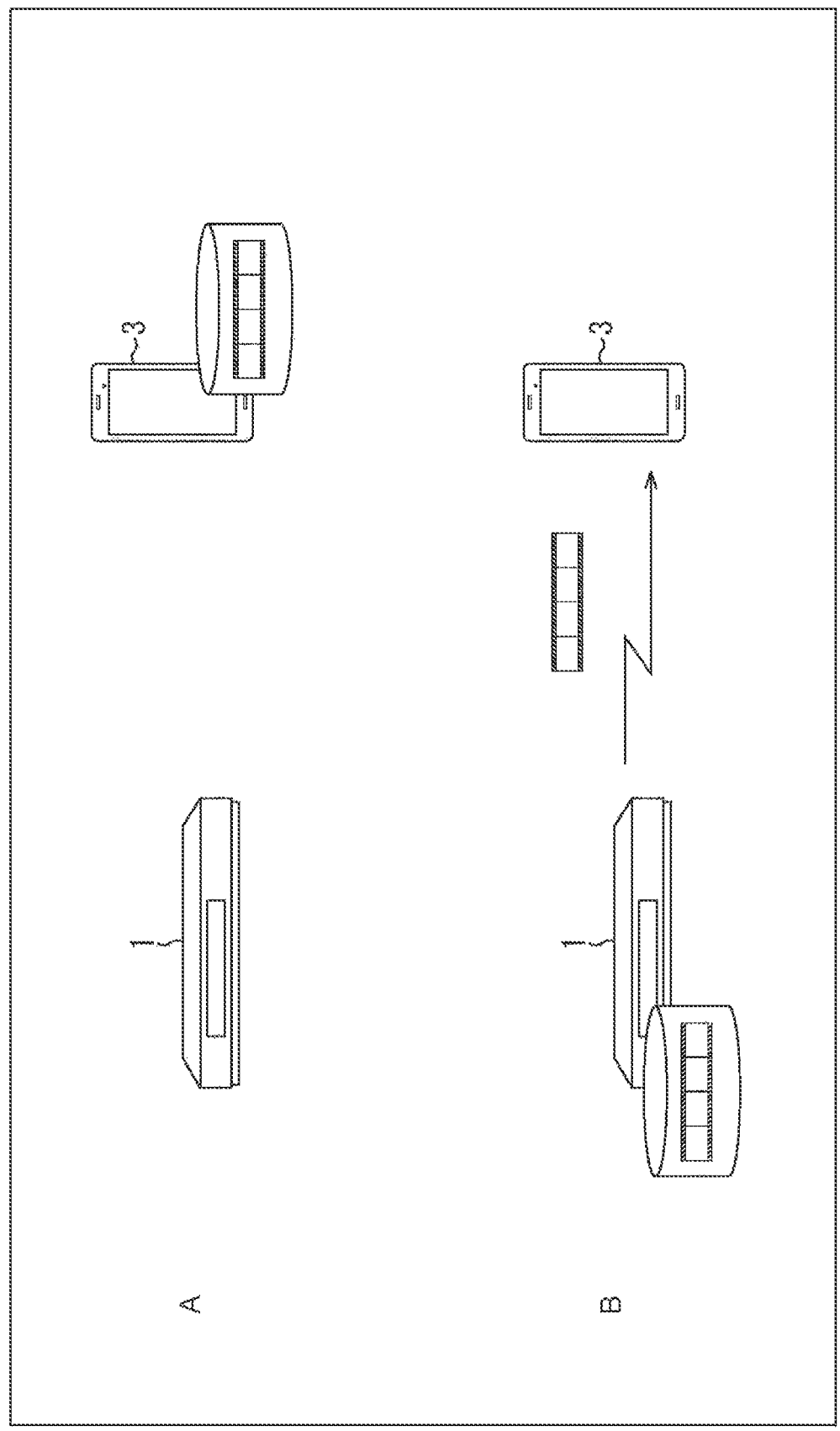

INFORMATION PROCESSING TERMINAL, INFORMATION PROCESSING METHOD, AND PROGRAM

CROSS-REFERENCE TO RELATED APPLICATIONS

This application is a national phase entry under 35 U.S.C. § 371 of International Application No. PCT/JP2020/010744 filed Mar. 12, 2020, which claims the priority from Japanese Patent Application No. 2019-059130 filed in the Japanese Patent Office on Mar. 26, 2019, the entire contents of which are hereby incorporated by reference.

TECHNICAL FIELD

The present technology relates to an information processing terminal, an information processing method, and a program, and particularly relates to an information processing terminal, an information processing method, and a program, each of which makes it possible to easily switch a setting regarding playback of content.

BACKGROUND ART

There has been a widespread form in which a recorded program is transferred to a portable terminal such as a smartphone or a tablet terminal and is viewed by using the portable terminal. Many users view a previous day's news program during commute time or the like at a playback speed faster than 1× speed serving as a normal playback speed.

CITATION LIST

Patent Document

Patent Document 1: Japanese Patent Application Laid-Open No. 2018-117311

SUMMARY OF THE INVENTION

Problems to be Solved by the Invention

Many general UIs for use in switching a playback speed display a list of playback speed options and allow a user to select one from the options displayed as a list. Operation using such UIs forces the user to perform the following two-step operation, i.e., an operation for displaying a list of options and an operation for selecting one option.

The present technology has been made in view of such a situation, and makes it possible to easily switch a setting regarding playback of content.

Solutions to Problems

An information processing terminal according to an aspect of the present technology includes a control unit that starts playback of content by using a default value as a setting value of a predetermined setting regarding playback, and controls the playback of the content so that, in a case where a switching operation for switching the predetermined setting is performed, the content is played back by using a setting value selected during previous playback.

In an aspect of the present technology, playback of content is started by using a default value as a setting value of a predetermined setting regarding playback, and the playback of the content is controlled so that, in a case where a switching operation for switching the predetermined setting is performed, the content is played back by using a setting value selected during previous playback.

BRIEF DESCRIPTION OF DRAWINGS

FIG. 12 illustrates examples of a location of content.

MODE FOR CARRYING OUT THE INVENTION

Hereinafter, modes for carrying out the present technology will be described. Description will be provided in the following order.

1. Configuration of content playback system
2. Switching playback speed in content viewing application
3. Configuration of portable terminal
4. Operation of portable terminal
5. Modification examples <Configuration of Content Playback System>

Figure 1:
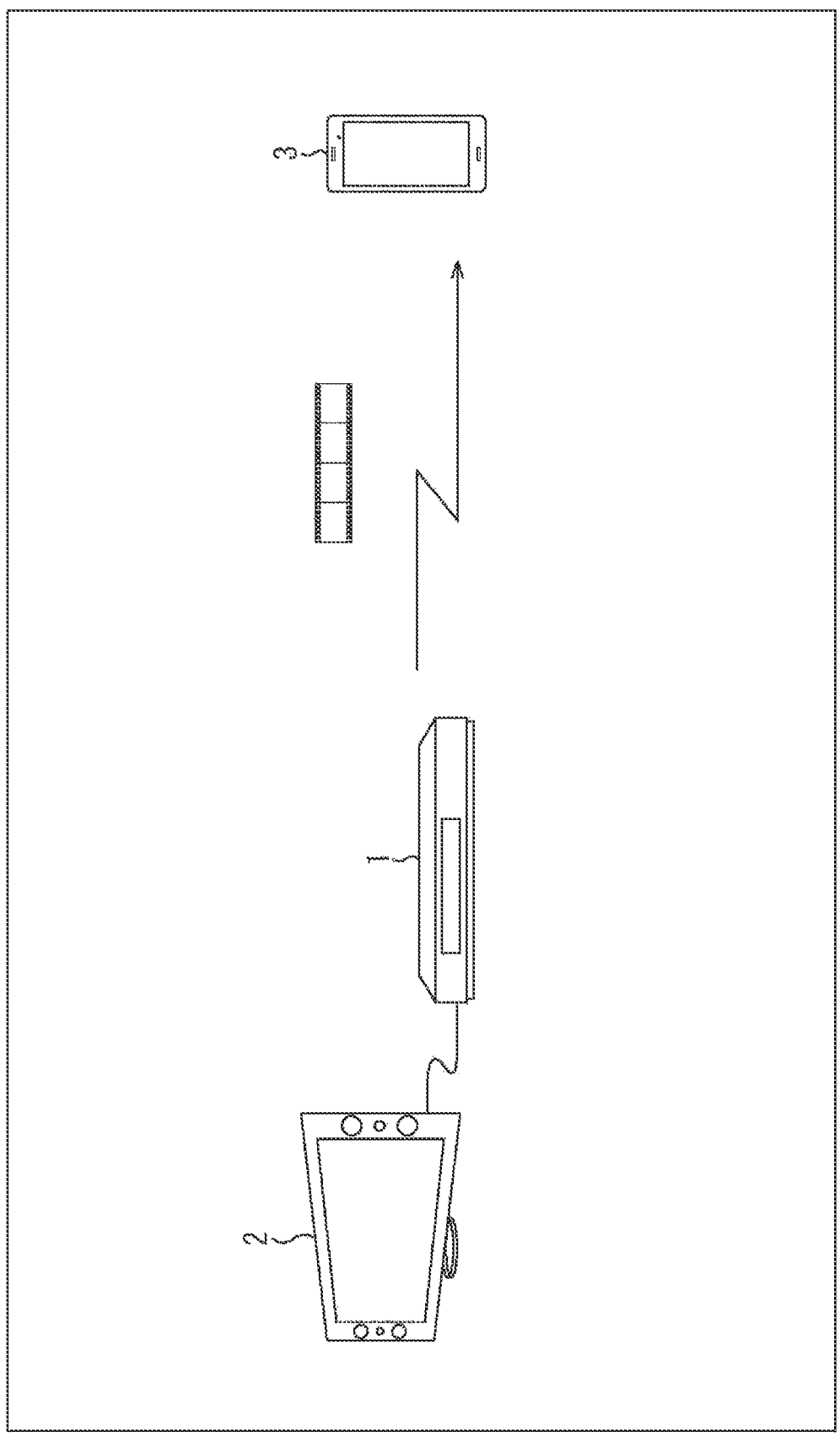
FIG. 1 illustrates a configuration example of a content playback system according to an embodiment of the present technology.

FIG. 1 illustrates a configuration example of a content playback system according to an embodiment of the present technology.

The content playback system in FIG. 1 includes a recording device 1, a television receiver (TV) 2, and a portable terminal 3. The recording device 1, the TV 2, and the portable terminal 3 are devices owned by the same user, for example.

The recording device 1 receives content provided via various transmission paths, such as content provided via a broadcast wave, content provided via a CATV line, and content provided from a predetermined server via the Internet, and records the received content on a recording medium. The recording medium such as an HDD or an SSD is included in or externally attached to the recording device 1.

Content processed by the recording device 1 is content including video and audio, such as a television program provided by a broadcast station and moving image content distributed by a moving image distribution service. A plurality of pieces of content is recorded as recorded content on the recording medium of the recording device 1.

The recording device 1 has a function of playing back the recorded content and outputting video and audio of the content to the TV 2.

Further, the recording device 1 has a function of transferring the recorded content to the portable terminal 3 via a network such as a wireless LAN or WAN.

The portable terminal 3 receives the content transferred from the recording device 1 and records the content on an internal recording medium such as a memory. The portable terminal 3 plays back the content recorded on the internal recording medium, displays the video of the content on a display, and outputs the audio from a speaker.

Thus, a content viewing application that is an application having a function of receiving and recording content transferred from the recording device 1 and playing back and outputting the content is installed in the portable terminal 3.

By starting the content viewing application and performing a predetermined operation, the user can transfer the content from the recording device 1 to the portable terminal 3 or can play back the content recorded on the internal recording medium of the portable terminal 3 and view the content on the portable terminal 3. The user can view the recorded content not only by using the TV 2 but also by using the portable terminal 3 outside the user's house or the like.

The example of FIG. 1 illustrates a smartphone as the portable terminal 3, but other devices such as a tablet terminal and a PC can also be used as the portable terminal 3.

<Switching Playback Speed in Content Viewing Application>

Figure 2:
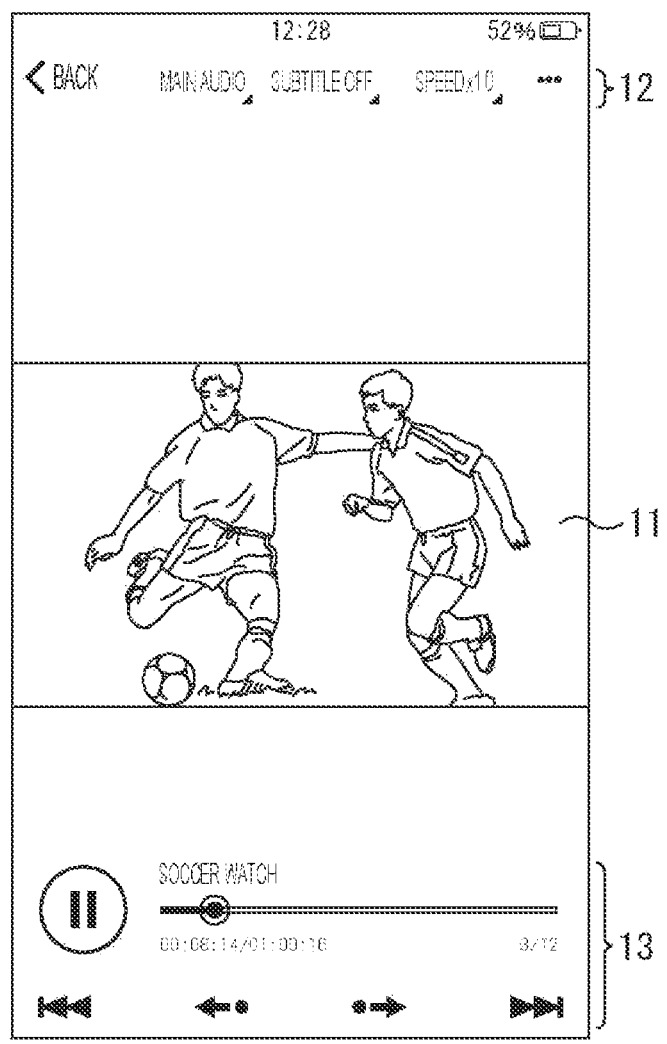
FIG. 2 illustrates an example of screen display of a content viewing application.

FIG. 2 illustrates an example of screen display of the content viewing application.

As illustrated in FIG. 2, a video display area 11 serving as a display area of video of content is provided substantially at the center of a screen of the content viewing application. In the example of FIG. 2, video of a recorded soccer program is displayed in the video display area 11.

A narrow band-shaped menu area 12 is provided in an upper part of the screen of the content viewing application. In the menu area 12, buttons for use in settings regarding playback of the content are displayed side by side.

An operation panel area 13 is provided in a lower part of the screen of the content viewing application. In the operation panel area 13, buttons for use in operating the content, such as a playback start button, a pause button, and a skip button, and information regarding the content, such as a title, are displayed.

The display of the portable terminal 3 is provided with a touchscreen. The user can perform various operations by pressing the buttons displayed as a graphical user interface (GUI) in the menu area 12 and the operation panel area 13.

Figure 3:
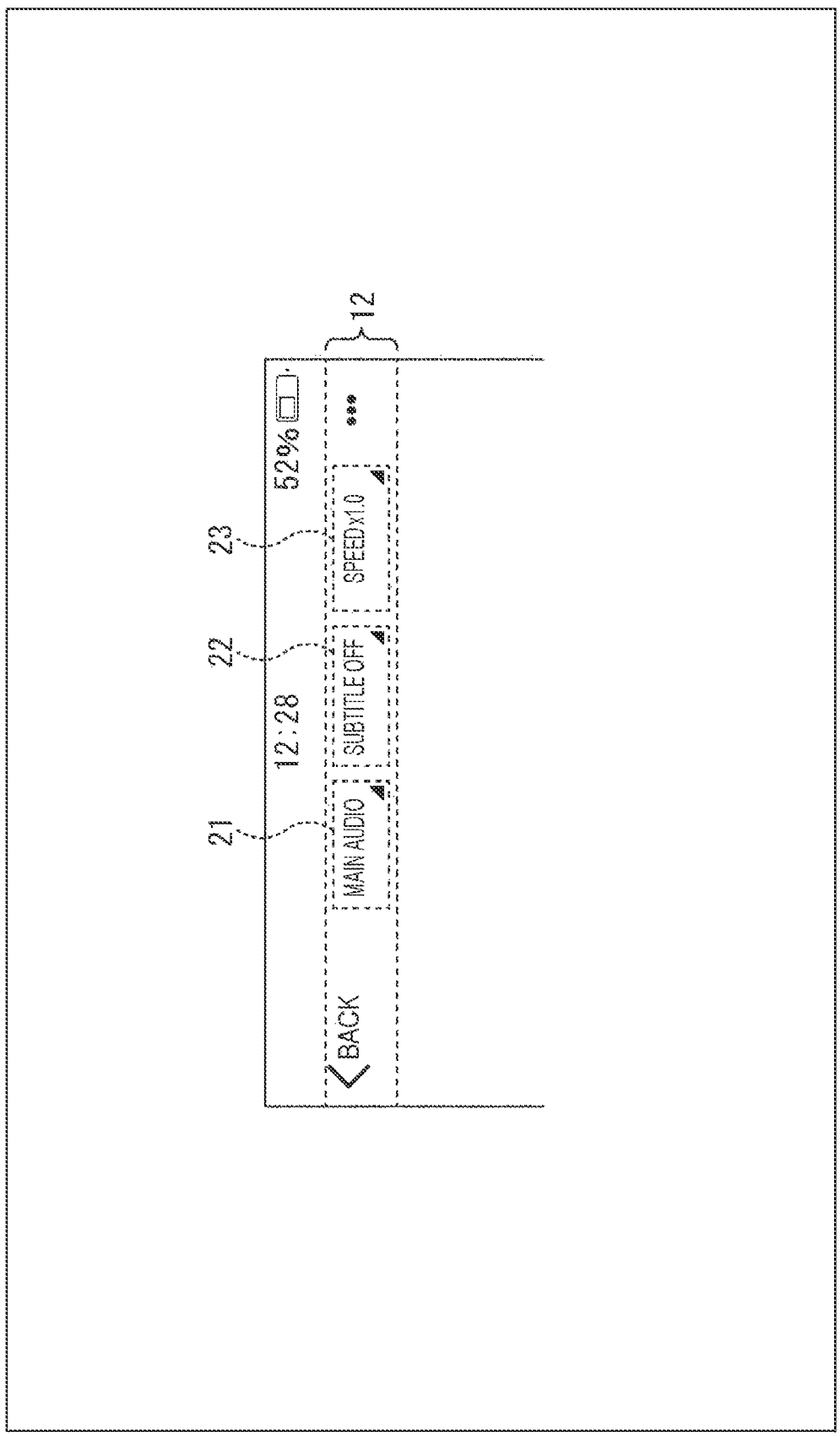
FIG. 3 is an enlarged view of a menu area.

FIG. 3 is an enlarged view of the menu area 12.

As indicated by broken lines, an audio switching button 21, a subtitle switching button 22, and a playback speed switching button 23 are displayed in the menu area 12. The broken lines in FIG. 3 are illustrated for convenience of description and are not actually displayed.

The audio switching button 21 is a button for use in an audio setting. In a case where the audio switching button 21 is pressed, a list including "main audio" and "secondary audio" serving as setting values of the audio setting is displayed. The user can select, from the list, which of the main audio or the secondary audio is used as audio of the content. The main audio is selected in the example of FIG. 3.

The subtitle switching button 22 is a button for use in a subtitle setting. In a case where the subtitle switching button 22 is pressed, a list including "ON" and "OFF" serving as setting values of the subtitle setting is displayed. The user can select whether subtitle display is on or off from the list. The subtitle display is selected to be off in the example of FIG. 3.

The playback speed switching button 23 is a button for use in a playback speed setting. In the example of FIG. 3, 1× speed serving as a normal playback speed is selected. "×1.0" displayed on the playback speed switching button 23 indicates that the 1× speed is selected.

Figure 4:
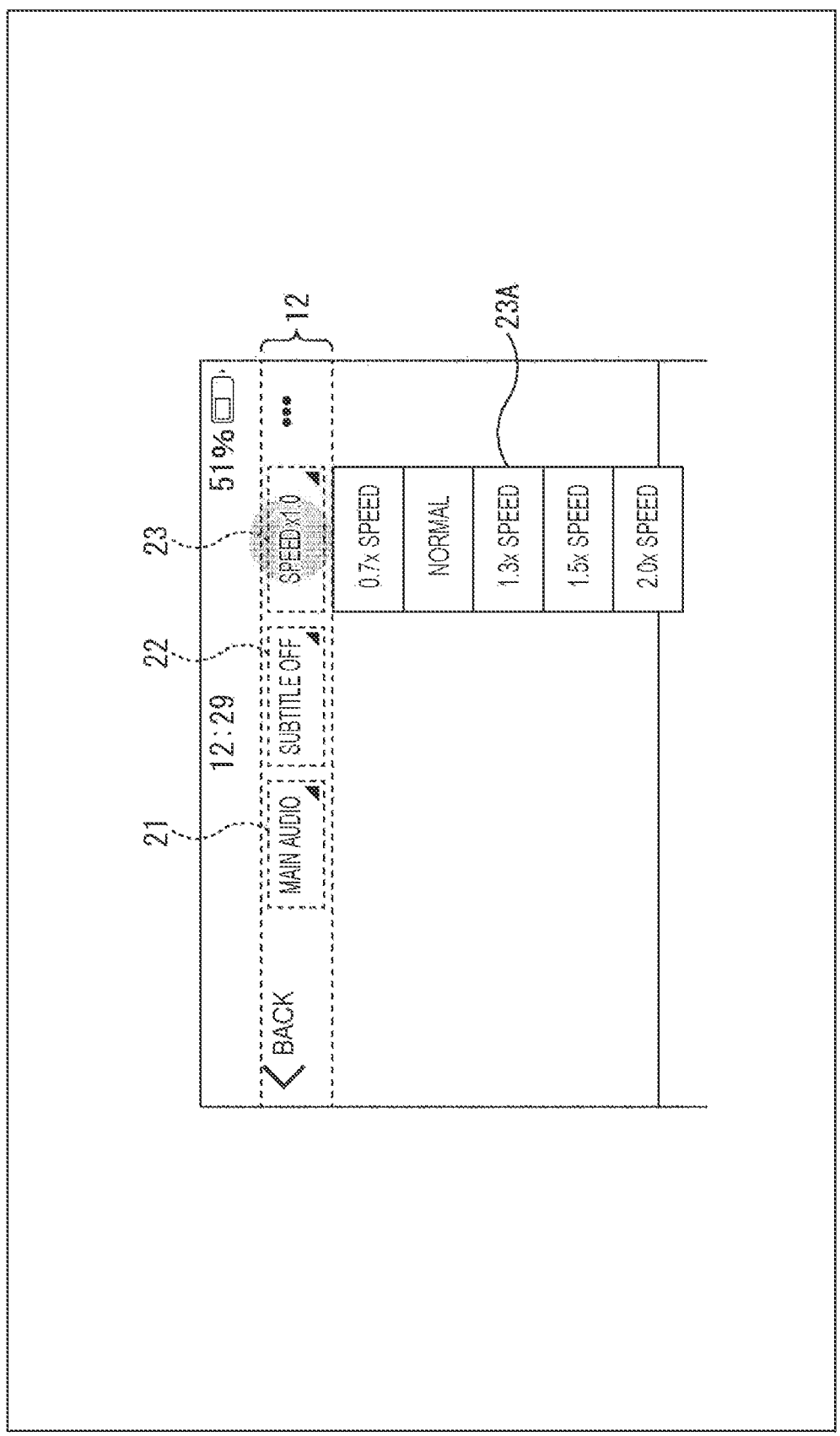
FIG. 4 illustrates a display example of a playback speed list.

FIG. 4 illustrates a display example of a playback speed list.

In a case where the playback speed switching button 23 is pressed at a predetermined timing such as during playback of the content, a playback speed list 23A serving as a list of setting values of the playback speed is displayed below the playback speed switching button 23 as illustrated in FIG. 4. In the example of FIG. 4, four types of setting values of "0.7× speed", "normal", "1.3× speed", "1.5× speed", and "2.0× speed" are displayed as options. The user can select a preferred playback speed from the playback speed list 23A as the playback speed of the content being played back.

Note that a colored circle on the playback speed switching button 23 in FIG. 4 indicates that the playback speed switching button 23 has been pressed. The same applies to the following drawings.

As described above, the content viewing application has a function of switching the playback speed of the content. By switching the playback speed of the content, the user can view fast playback/slow playback of the content.

Further, the content viewing application has a one-step switching function that is a function of easily switching the playback speed of the content to the same playback speed as a previously used playback speed.

The previously used playback speed is, for example, a playback speed selected by the user when the user has viewed content by using the content viewing application at the most recent time based on a current timing of viewing the content by using the content viewing application. The previously played back content and the currently played back content may be the same or different.

Figure 5:
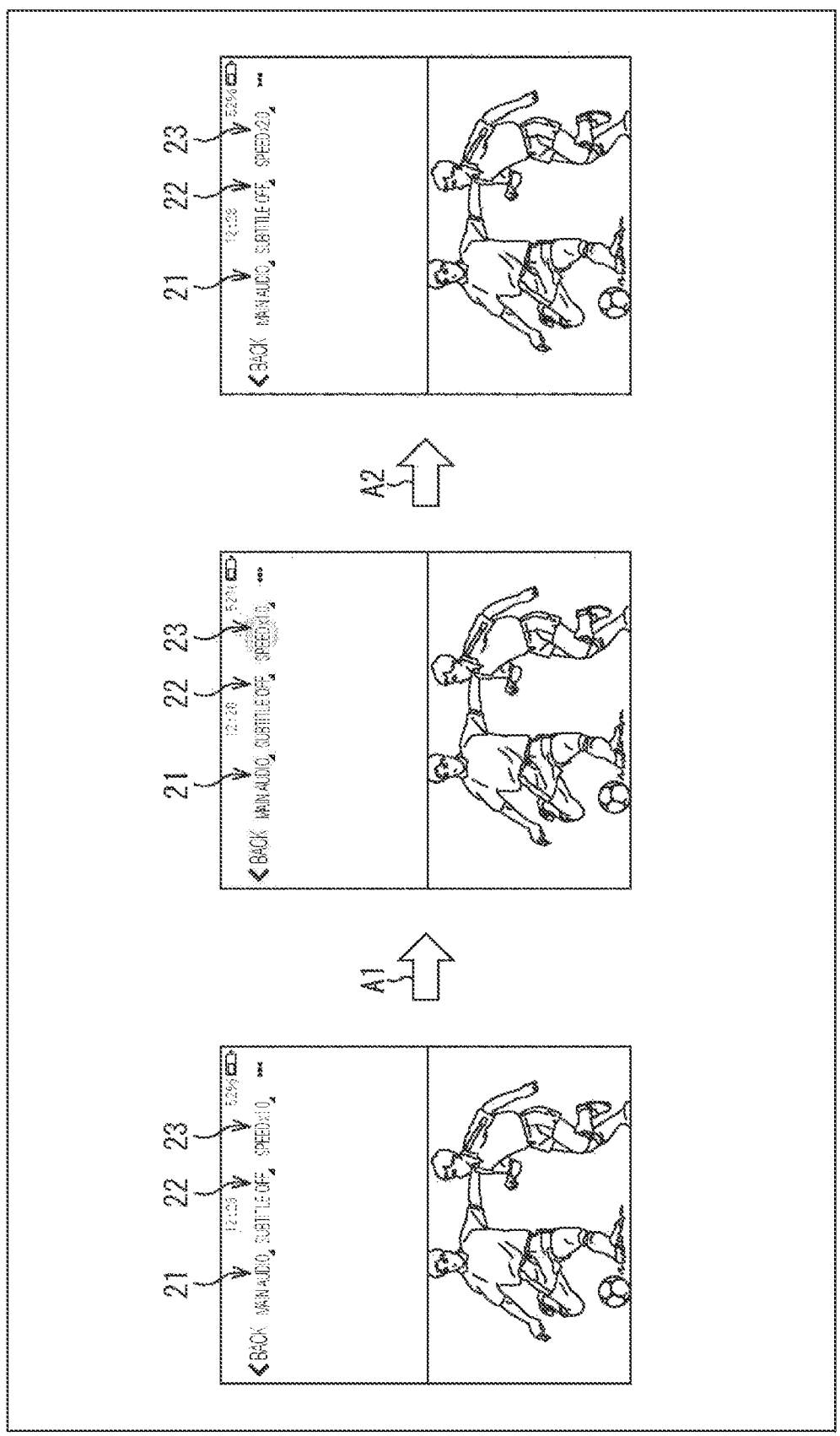
FIG. 5 illustrates an example of switching a playback speed by a one-step switching function.

FIG. 5 illustrates an example of switching the playback speed by the one-step switching function.

Herein, it is assumed that the user has selected 2.0× speed (×2.0) as the playback speed at the previous playback of the content. Information indicating that the previously used playback speed is 2.0× speed is stored and is managed by the content viewing application.

In a case where an instruction is made to start playback of predetermined content, playback of the content selected by the user is started at a normal (default) playback speed as illustrated in a left screen of FIG. 5. "×1.0" indicating that the normal playback speed is selected is displayed on the playback speed switching button 23 in the left screen of FIG. 5.

In a case where the playback speed switching button 23 is pressed once as in a screen indicated by an arrow A1 during normal playback that is playback at a normal playback speed, the same playback speed as the previously used playback speed, i.e., 2× speed is selected as in a screen indicated by an arrow A2. The playback speed of the content is switched, and the playback of the content is continued at 2× speed serving as the previously used playback speed.

"×2.0" indicating that the same playback speed as the previously used playback speed is selected is displayed on the playback speed switching button 23 in the right screen of FIG. 5.

Thus, the one-step switching function is a function of performing normal playback at the start of playback of the content and, in a case where the playback speed switching button 23 is pressed once, switching the playback speed of the content to the playback speed previously used by the user.

The user can switch the playback speed of the content to the previously used playback speed only by pressing the playback speed switching button 23 once. That is, the user does not need to perform a two-step operation of pressing the playback speed switching button 23 to display the playback speed list 23A and selecting a predetermined playback speed in that state.

In the example of FIG. 5, the same illustration is displayed in the video display area 11 on each screen, but the video of the content actually changes with the lapse of time.

Figure 6:
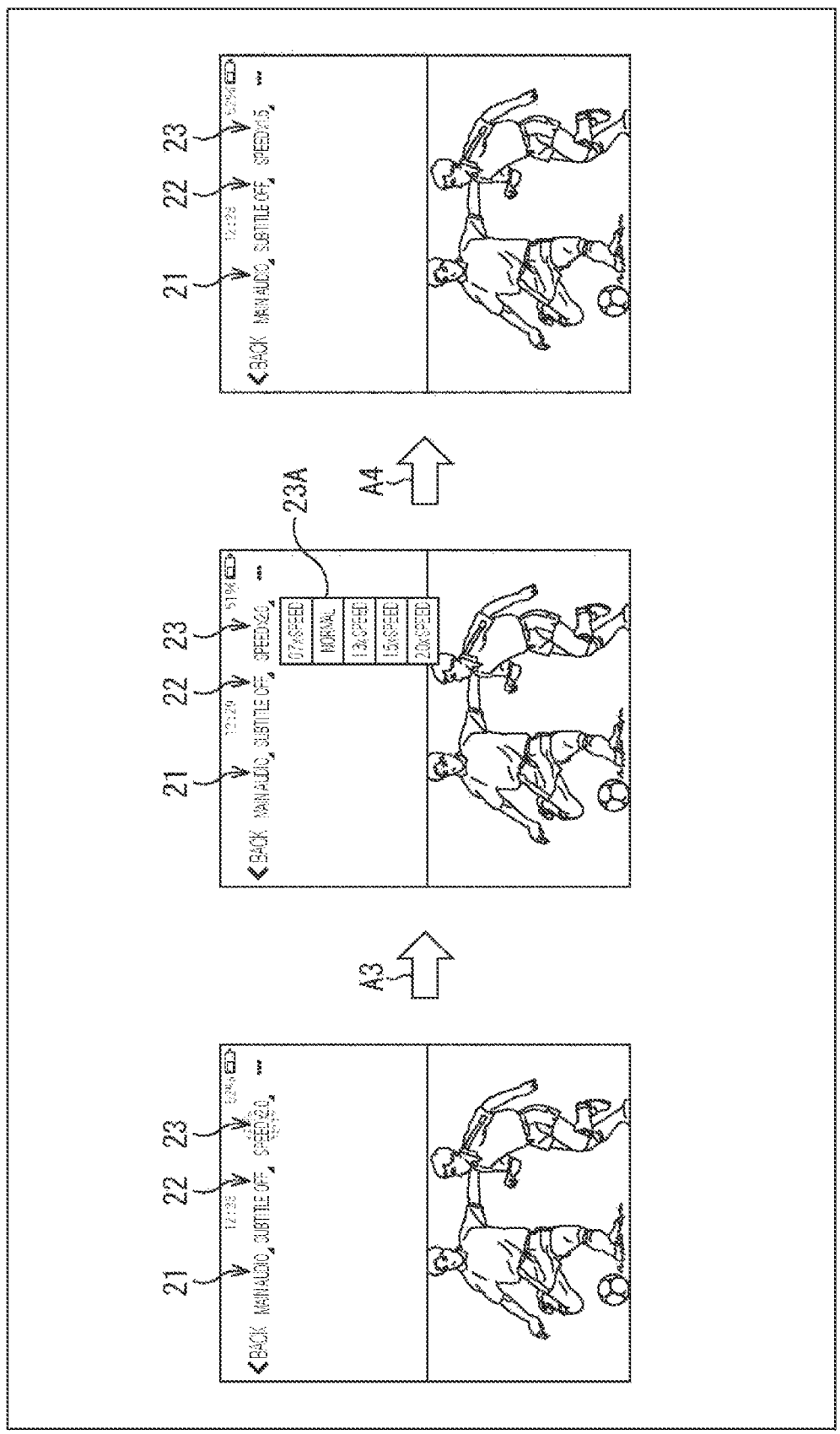
FIG. 6 illustrates an example of switching a playback speed by a one-step switching function.

In a case where the playback speed switching button 23 is pressed once as in a left screen of FIG. 6 during the playback of the content at 2× speed serving as the previously used playback speed, the playback speed list 23A is displayed as in a screen indicated by an arrow A3. The user can select a preferred playback speed from the playback speed list 23A, such as a playback speed different from the previously used playback speed (currently selected playback speed).

Thus, the first pressing of the playback speed switching button 23 is an operation for switching the playback speed of the content to the same playback speed as the previously used playback speed, and the second pressing thereof is an operation for displaying the playback speed list 23A.

For example, in a case where 1.5× speed is selected as the playback speed from the playback speed list 23A, the playback speed of the content is switched as in a screen indicated by an arrow A4, and the playback of the content is continued at 1.5× speed serving as the playback speed. "×1.5" indicating that 1.5× speed is selected as the playback speed is displayed on the playback speed switching button 23 in the right screen of FIG. 6.

In a case where 1.5× speed is selected as the playback speed, information indicating that the previously used playback speed is 1.5× speed is stored and is appropriately used by the content viewing application when the next content is played back.

As described above, the user can easily switch the playback speed of the content to the previously used playback speed by using the one-step switching function. Processing of the content viewing application for switching the playback speed of the content as described above will be described later with reference to a flowchart.

<Configuration of Portable Terminal>

Figure 7:
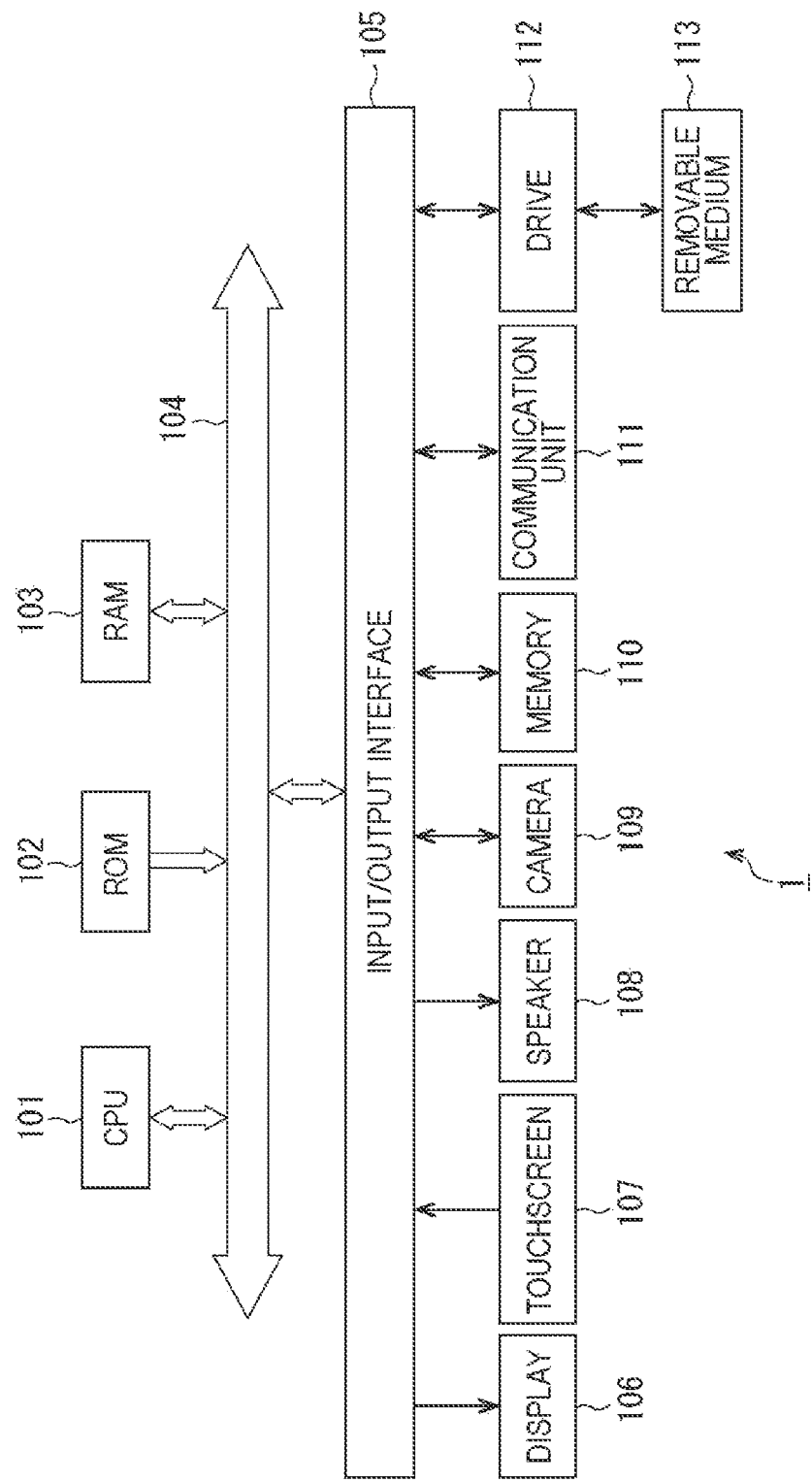
FIG. 7 is a block diagram illustrating a hardware configuration example of a portable terminal.

FIG. 7 is a block diagram illustrating a hardware configuration example of the portable terminal 3.

A central processing unit (CPU) 101, a read only memory (ROM) 102, and a random access memory (RAM) 103 are connected to each other by a bus 104.

The bus 104 is further connected to an input/output interface 105. The input/output interface 105 is connected to a display 106, a touchscreen 107, a speaker 108, a camera 109, a memory 110, a communication unit 111, and a drive 112.

The display 106 includes an LCD, an organic EL display, or the like. The display 106 displays such a screen of the content viewing application as described above.

The touchscreen 107 detects a user operation on a surface of the display 106 and outputs information indicating details of the user operation.

The speaker 108 outputs various sounds such as audio and music of content.

The camera 109 captures an image in response to a user operation and outputs image data.

The memory 110 stores various data such as a program executed by the CPU 101 and content transferred from the recording device 1.

The communication unit 111 is an interface for wireless communication. The communication unit 111 communicates with external devices such as the recording device 1 and a server connected via the Internet.

The drive 112 drives a removable medium 113 such as a memory card, writes data to the removable medium 113, and reads data stored in the removable medium 113.

Figure 8:
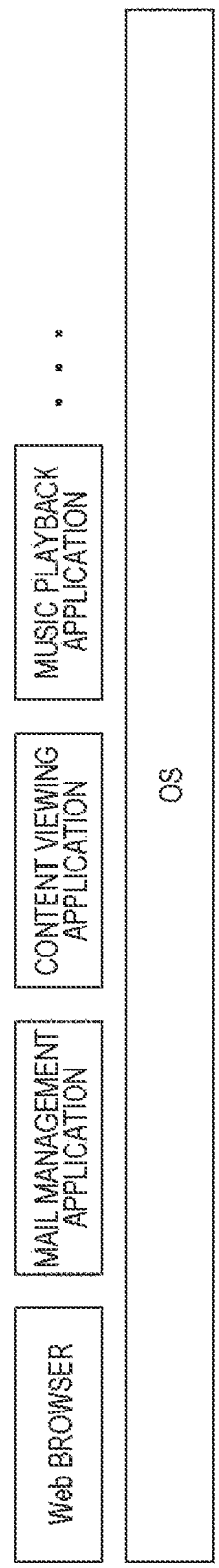
FIG. 8 illustrates an example of an application structure.

FIG. 8 illustrates an example of an application structure.

As illustrated in FIG. 8, a plurality of applications operating on an operating system (OS) is installed in the portable terminal 3. The example of FIG. 8 shows not only the content viewing application described above but also a web browser, a mail management application, and a music playback application.

The web browser displays a web page on the basis of information received from a server on the Internet. The mail management application is a mailer and manages sending and receiving of emails. The music playback application plays back music data stored in the memory 110 of the portable terminal 3 or music data received via the Internet, and outputs music from the speaker 108 of the portable terminal 3.

Thus, the portable terminal 3 is a device in which various applications including the content viewing application can be installed to extend a function thereof.

Figure 9:
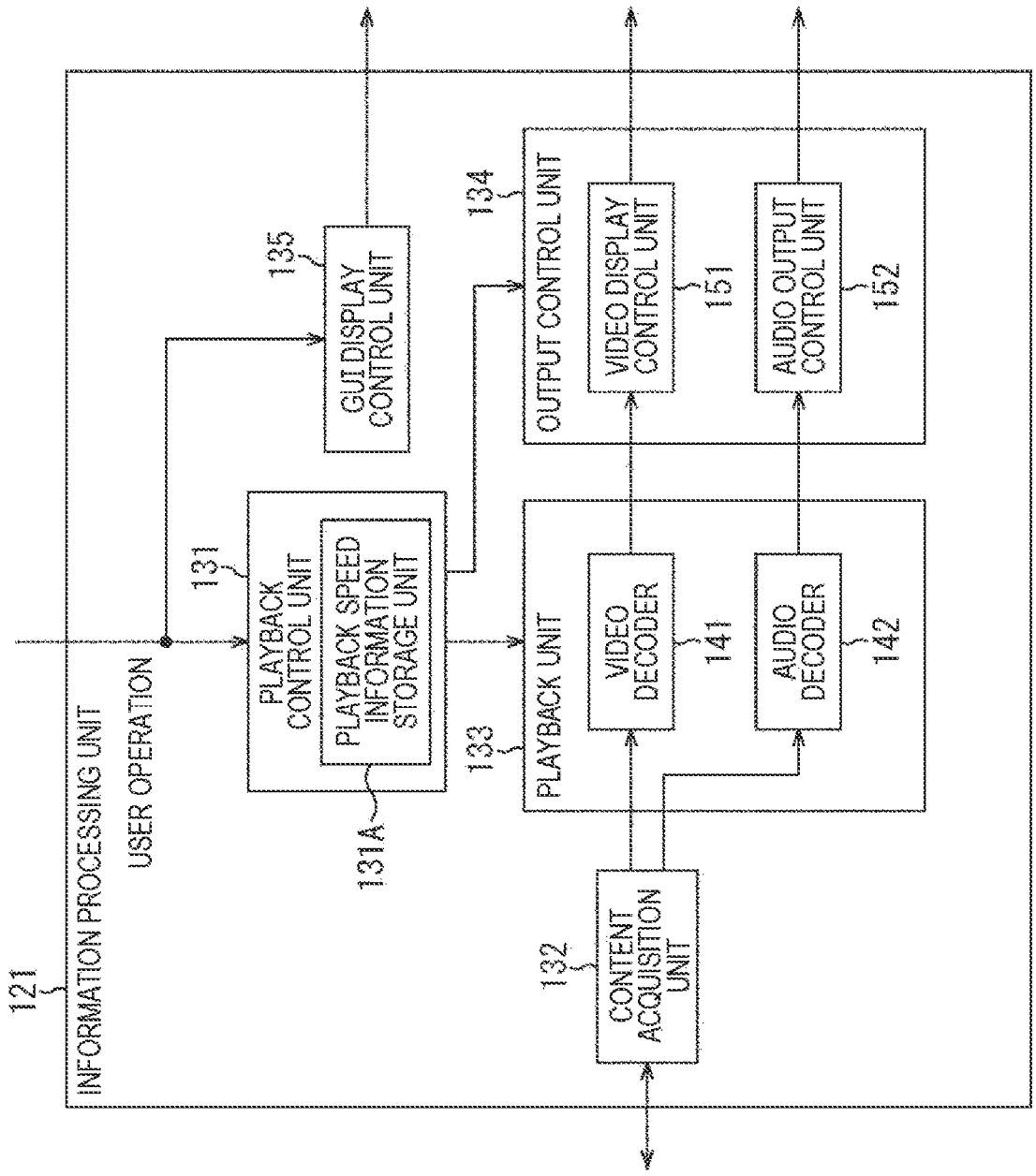
FIG. 9 is a block diagram illustrating a functional configuration example of a portable terminal.

FIG. 9 is a block diagram illustrating a functional configuration example of the portable terminal 3.

In the portable terminal 3, the CPU 101 in FIG. 7 executes the content viewing application to implement an information processing unit 121. The portable terminal 3 is an information processing terminal including the information processing unit 121.

As illustrated in FIG. 9, the information processing unit 121 includes a playback control unit 131, a content acquisition unit 132, a playback unit 133, an output control unit 134, and a GUI display control unit 135.

The playback control unit 131 controls playback of content by the playback unit 133. For example, the playback control unit 131 switches a playback speed of the content to the same playback speed as a previously used playback speed. A playback speed information storage unit 131A included in the playback control unit 131 stores information indicating the playback speed previously used by the user.

Further, the playback control unit 131 controls output of the content by the output control unit 134. Under the control of the playback control unit 131, video of the content is displayed on the display 106, and audio of the content is output from the speaker 108.

The content acquisition unit 132 acquires data of content to be played back. For example, the content acquisition unit 132 acquires a piece of content selected by the user from pieces of content transferred from the recording device 1 and stored in the memory 110.

The content acquisition unit 132 extracts video data from the data of the content and outputs the video data to a video decoder 141 of the playback unit 133, and extracts audio data therefrom and outputs the audio data to an audio decoder 142.

The playback unit 133 includes the video decoder 141 and the audio decoder 142.

The video decoder 141 decodes the video data of the content, and outputs the decoded video data to a display control unit 151.

The audio decoder 142 decodes the audio data of the content and outputs the decoded audio data to an audio output control unit 152.

The output control unit 134 includes the display control unit 151 and the audio output control unit 152.

The display control unit 151 causes the display 106 to display video of the content on the basis of the data supplied from the video decoder 141.

The audio output control unit 152 causes the speaker 108 to output audio of the content on the basis of the data supplied from the audio decoder 142.

As described with reference to FIGS. 5 and 6, the GUI display control unit 135 controls, in response to a user operation, display of the menu area 12 serving as a part of the screen of the content viewing application.

<Operation of Portable Terminal>

Herein, processing of the portable terminal 3 for playing back content will be described with reference to the flowchart of FIG. 10.

Figure 10:
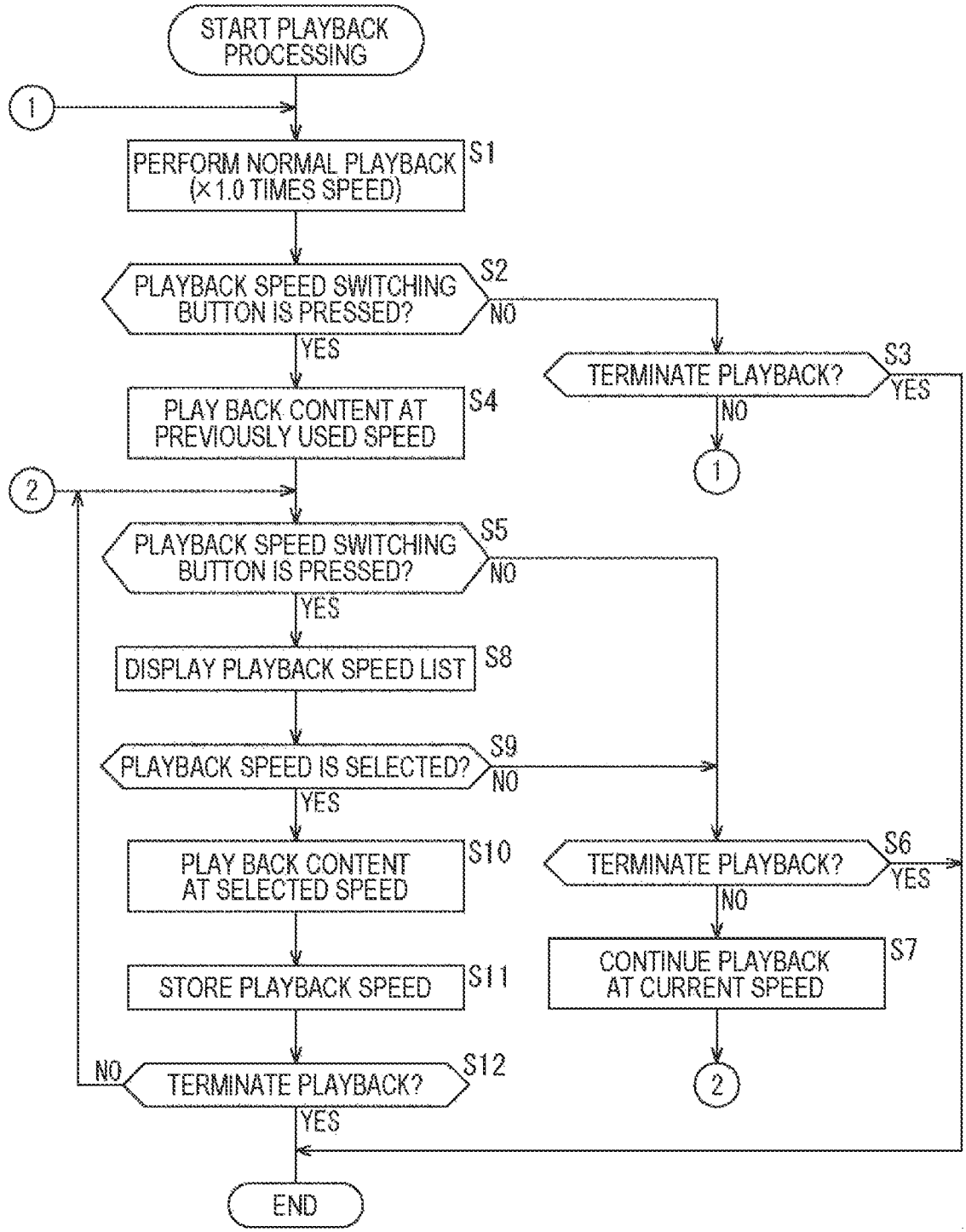
FIG. 10 is a flowchart showing playback processing of a portable terminal.

The processing in FIG. 10 is started when the content viewing application is activated and the content to be played back is selected by the user. Data of the content selected by the user is acquired by the content acquisition unit 132 and is supplied to the playback unit 133.

In step S1, the playback control unit 131 controls the playback unit 133 to perform normal playback that is playback at a normal playback speed.

In step S2, the playback control unit 131 determines whether or not the playback speed switching button 23 has been pressed.

In a case where it is determined in step S2 that the playback speed switching button 23 has not been pressed, the playback control unit 131 determines whether or not to terminate playback of the content in step S3.

In step S3, in a case where it is determined to terminate the playback of the content, the playback control unit 131 terminates the playback of the content, whereas, in a case where it is determined not to terminate the playback of the content, the processing returns to step S1 and the normal playback is continued.

Meanwhile, in a case where it is determined in step S2 that the playback speed switching button 23 has been pressed, in step S4, the playback control unit 131 switches the playback speed of the content and continues the playback of the content at the same playback speed as a previously used playback speed. The previously used playback speed is specified on the basis of information stored in the playback speed information storage unit 131A.

The one-step switching function is achieved by the above processing, and the content is played back fast or slowly at the same playback speed as the playback speed previously used by the user.

In step S5, the playback control unit 131 determines whether or not the playback speed switching button 23 has been pressed again.

In a case where it is determined in step S5 that the playback speed switching button 23 has not been pressed, the playback control unit 131 determines whether or not to terminate the playback of the content in step S6.

In step S6, in a case where it is determined to terminate the playback of the content, the playback control unit 131 terminates the playback of the content, whereas, in a case where it is determined not to terminate the playback of the content, the processing proceeds to step S7, and the content is continuously played back at the current playback speed. Thereafter, the processing returns to step S5, and the above processing is repeated.

Meanwhile, in a case where it is determined in step S5 that the playback speed switching button 23 has been pressed, the GUI display control unit 135 causes the playback speed list 23A to be displayed in step S8.

In step S9, the playback control unit 131 determines whether or not a predetermined playback speed, such as a playback speed different from the currently selected playback speed, has been selected from the playback speed list 23A. In a case where it is determined in step S9 that the playback speed has not been selected, the processing proceeds to step S6, and the processing of step S6 and subsequent steps is performed.

In a case where it is determined in step S9 that the playback speed has been selected, in step S10, the playback control unit 131 switches the playback speed of the content and continues the playback of the content at the playback speed selected from the playback speed list 23A.

In step S11, the playback control unit 131 causes information indicating the selected playback speed to be stored in the playback speed information storage unit 131A. The playback speed indicated by the information stored in the playback speed information storage unit 131A is used when the one-step switching function is operated during the next playback.

In step S12, the playback control unit 131 determines whether or not to terminate the playback of the content, and, in a case where it is determined not to terminate the playback of the content, the processing returns to step S5 and the above processing is repeated.

Meanwhile, in a case where it is determined to terminate the playback of the content in step S12, the playback control unit 131 terminates the playback of the content.

With the above processing, the user can easily switch the playback speed of the content to the same playback speed as the previously used playback speed only by pressing the playback speed switching button 23 once.

By selecting a preferred playback speed once, the user can easily switch the playback speed of the content to the preferred playback speed when the content is played back the next or subsequent time.

The single playback speed switching button 23 can have both a function of a button for use in selecting fast playback and a function of a button for use in selecting slow playback.

Modification Examples

Examples Applied to Settings Other than Setting of Playback Speed

There has been described a case where the playback speed of the content is switched by the one-step switching function, but switching a setting by using the one-step switching function is applicable to various settings regarding the playback of the content, such as an audio setting and a subtitle setting.

The audio setting is switched by using the above-described audio switching button 21 (FIG. 3). Further, the subtitle setting is switched by using the subtitle switching button 22.

There will be described a case where a setting value of the audio setting is switched by the one-step switching function. Herein, it is assumed that the user has used secondary audio as a previous audio setting.

In this case, the content is played back by using, for example, main audio that is a normal audio setting at the start of playback of the content.

In a case where the audio switching button 21 is pressed once during the playback of the content using the main audio, the audio setting is switched to the secondary audio that is the previously used audio setting.

In a case where the audio switching button 21 is pressed again during the playback of the content using the secondary audio, an audio setting list is displayed, and either the main audio or the secondary audio can be selected. The audio selected herein is stored as information indicating the previously used audio setting.

The subtitle setting can be similarly switched by the one-step switching function.

The one-step switching function is applicable not only to the audio setting and the subtitle setting but also to various settings regarding the playback of the content such as an image quality setting and an audio quality setting.

A plurality of settings regarding the playback of the content may be collectively switched by the one-step switching function.

Figure 11:
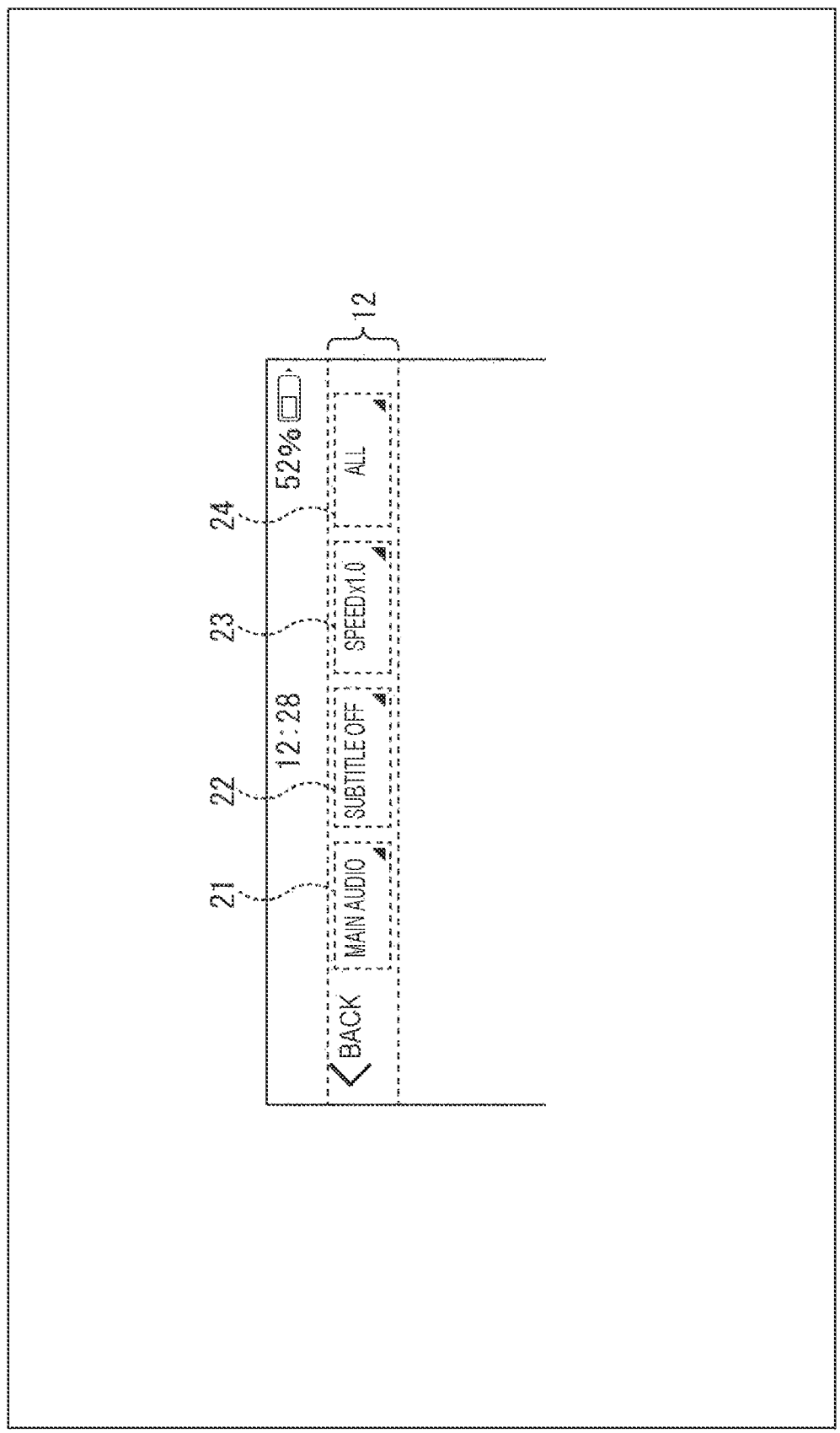
FIG. 11 is another enlarged view of a menu area.

FIG. 11 is another enlarged view of the menu area 12.

In the example of FIG. 11, a button 24 is displayed to the right of the playback speed switching button 23. The button 24 is a button operated when a plurality of settings regarding the playback of the content is collectively switched by the one-step switching function.

In a case where the button 24 is pressed once during the playback of the content using normal setting values, the setting values of the audio setting, the subtitle setting, and the playback speed setting are switched to the same setting values as setting values previously used by the user, respectively.

Thus, a plurality of settings may be collectively switched by the one-step switching function.

Control of One-Step Switching Function Depending on Location of Content

Enabling/disabling switching the setting of the playback speed by the one-step switching function may be controlled depending on a location (supply source) of the content.

FIG. 12 illustrates examples of the location of the content.

As illustrated in A of FIG. 12, in a case where the content to be played back is recorded on the internal recording medium of the portable terminal 3, switching the setting of the playback speed by the one-step switching function is enabled. As described above, the user can switch the playback speed of the content by using the one-step switching function.

Meanwhile, as illustrated in B of FIG. 12, in a case where the content to be played back is recorded on the recording medium included in the recording device 1 and the content is viewed on the portable terminal 3 by streaming, switching the playback speed is disabled due to performance of the device or limitation on a communication speed. In this case, switching the setting of the playback speed by the one-step switching function is disabled.

Other

A case of playing back the content transferred from the recording device 1 and recorded in the portable terminal 3 has been described, but switching a setting by the one-step switching function may be used when moving image content distributed by a moving image distribution service is played back. In this case, at least a part of the configuration of the information processing unit 121 in FIG. 9 is achieved in a server that provides the moving image distribution service.

A setting value to be switched by the one-step switching function may be different depending on a genre of the content being played back.

For example, in a case where an instruction is made to switch the setting of the playback speed by the one-step switching function, the playback speed is switched to 2× speed when the genre of the content being played back is "news", and the playback speed is switched to 1× speed when the genre of the content being played back is "movie".

Thus, the setting value to be switched by the one-step switching function may be individually selected by the user depending on an attribute of the content such as a genre.

The content to be played back is assumed to be content including video and audio, but the one-step switching function described above may be used when other pieces of content such as recorded audio are played back.

The operation for using the one-step switching function is assumed to be an operation of pressing the playback speed switching button 23 once, but the one-step switching function may be used by other operations such as a swipe operation and a gesture operation.

Regarding Program

The series of processing described above can be executed by hardware or can be executed by software. In a case where the series of processing is executed by software, a program constituting the software is installed in a computer incorporated in dedicated hardware, a general-purpose personal computer, or the like.

The program to be installed is provided by being recorded on the removable medium 113 of FIG. 7 including an optical disk (compact disc-read only memory (CD-ROM), digital versatile disc (DVD), or the like), a semiconductor memory, or the like. Further, the program may also be provided via a wired or wireless transmission medium such as a local area network, the Internet, or digital broadcasting. The program can be installed in the ROM 102 or the memory 110 in advance.

Note that the program executed by the computer may be a program in which the processing is performed in time series in the order described in the present specification, or may be a program in which the processing is performed in parallel or at a necessary timing such as when a call is made.

In the present specification, a system means a set of a plurality of components (apparatuses, modules (parts), and the like), and it does not matter whether or not all the components are included in the same housing. Therefore, a plurality of apparatuses included in separate housings and connected via a network and a single apparatus including a plurality of modules in a single housing are both systems.

The effects described in the present specification are merely illustrative and are not limited. Further, additional effects may be obtained.

The embodiments of the present technology are not limited to the above embodiments, and can be variously modified without departing from the gist of the present technology.

For example, the present technology can have a configuration of cloud computing in which a single function is shared and jointly processed by a plurality of apparatuses via a network.

Further, each of the steps described in the above flowchart can be executed by a single apparatus, or can be executed by being shared by a plurality of apparatuses.

Furthermore, in a case where a single step includes a plurality of processes, the plurality of processes included in the single step can be executed by a single apparatus, or can be executed by being shared by a plurality of apparatuses.

Examples of Combination of Configurations

The present technology can also have the following configurations.

(1)

An information processing terminal including a control unit that starts playback of content by using a default value as a setting value of a predetermined setting regarding playback, and controls the playback of the content so that, in a case where a switching operation for switching the predetermined setting is performed, the content is played back by using a setting value selected during previous playback.

(2)

The information processing terminal according to (1), further including a display control unit that causes a list for use in selecting a setting value to be displayed in a case where a same operation as the switching operation is performed during the playback of the content using the setting value selected during the previous playback.

(3)

The information processing terminal according to (1) or (2), in which the switching operation is an operation of pressing a button once.

(4)

The information processing terminal according to (2), further including a storage unit that stores information indicating a setting value selected from the list as information indicating the setting value selected during the previous playback.

(5)

The information processing terminal according to any one of (1) to (4), in which the control unit enables, depending on a supply source of the content, a function of playing back the content by using the setting value selected during the previous playback in a case where the switching operation is performed.

(6)

The information processing terminal according to (5), in which the control unit enables the function in a case where the supply source of the content is a recording medium included in the information processing terminal, and disables the function in a case where the supply source of the content is a recording medium of an external device connected via a network.

(7)

The information processing terminal according to any one of (1) to (6), in which in a case where the switching operation is performed, the control unit plays back the content by using a setting value selected during previous playback of content of a same genre as the content.

(8)

The information processing terminal according to any one of (1) to (7), in which the predetermined setting is a setting of a playback speed of the content including video and audio.

(9)

An information processing method including causing an information processing terminal to start playback of content by using a default value as a setting value of a predetermined setting regarding playback, and control the playback of the content so that, in a case where a switching operation for switching the predetermined setting is performed, the content is played back by using a setting value selected during previous playback.

(10)

A program for causing a computer to execute processing of starting playback of content by using a default value as a setting value of a predetermined setting regarding playback, and controlling the playback of the content so that, in a case where a switching operation for switching the predetermined setting is performed, the content is played back by using a setting value selected during previous playback.

REFERENCE SIGNS LIST

1 Recording device
3 Portable terminal
121 Information processing unit
131 Playback control unit
131A Playback speed information storage unit
132 Content acquisition unit
133 Playback unit
134 Output control unit
135 GUI display control unit

The invention claimed is:

1. An information processing terminal comprising
a control unit that starts playback of content by using a default value as a setting value of a predetermined setting regarding playback, and controls the playback of the content so that, in a case where a first switching operation for switching the predetermined setting is performed by pressing a button once, the content is played back by using a setting value selected during previous playback, the setting value selected during previous playback being different from the default value; and
a display control unit that causes a list for use in selecting a setting value to be displayed in a case where a second switching operation is performed during the playback of the content using the setting value selected during the previous playback, the second switching operation being performed by pressing the button once again.

2. The information processing terminal according to claim 1, further comprising
a storage unit that stores information indicating a setting value selected from the list as information indicating the setting value selected during the previous playback.

3. The information processing terminal according to claim 1, wherein
the control unit enables, depending on a supply source of the content, a function of playing back the content by using the setting value selected during the previous playback in a case where the switching operation is performed.

4. The information processing terminal according to claim 3, wherein
the control unit enables the function in a case where the supply source of the content is a recording medium included in the information processing terminal, and disables the function in a case where the supply source of the content is a recording medium of an external device connected via a network.

5. The information processing terminal according to claim 1, wherein
in a case where the switching operation is performed, the control unit plays back the content by using a setting value selected during previous playback of content of a same genre as the content.

6. The information processing terminal according to claim 1, wherein the predetermined setting is a setting of a playback speed of the content including video and audio.

7. An information processing method comprising causing an information processing terminal to start playback of content by using a default value as a setting value of a predetermined setting regarding playback, control the playback of the content so that, in a case where a first switching operation for switching the predetermined setting is performed by pressing a button once, the content is played back by using a setting value selected during previous playback, the setting value selected during previous playback being different from the default value, and cause a list for use in selecting a setting value to be displayed in a case where a second switching operation is performed during the playback of the content using the setting value selected during the previous playback, the second switching operation being performed by pressing the button once again.

8. A non-transitory computer-readable medium having stored thereon a computer-readable program for causing a computer to execute processing of starting playback of content by using a default value as a setting value of a predetermined setting regarding playback, controlling the playback of the content so that, in a case where a first switching operation for switching the predetermined setting is performed by pressing a button once, the content is played back by using a setting value selected during previous playback, the setting value selected during previous playback being different from the default value, and causing a list for use in selecting a setting value to be displayed in a case where a second switching operation is performed during the playback of the content using the setting value selected during the previous playback, the second switching operation being performed by pressing the button once again.

* * * * *